US009473836B2

(12) United States Patent
Khotimsky

(10) Patent No.: US 9,473,836 B2
(45) Date of Patent: Oct. 18, 2016

(54) MAINTAINING CHANNEL-INVARIANT OPTICAL NETWORK UNIT (ONU) EQUALIZATION DELAY IN A PASSIVE OPTICAL NETWORK

(71) Applicant: Verizon Patent and Licensing Inc., Arlington, VA (US)

(72) Inventor: Denis Andreyevich Khotimsky, Westborough, MA (US)

(73) Assignee: VERIZON PATENT AND LICENSING INC., Basking Ridge, NJ (US)

( * ) Notice: Subject to any disclaimer, the term of this patent is extended or adjusted under 35 U.S.C. 154(b) by 0 days.

(21) Appl. No.: 14/753,576

(22) Filed: Jun. 29, 2015

(65) Prior Publication Data

US 2016/0073180 A1 Mar. 10, 2016

Related U.S. Application Data

(60) Provisional application No. 62/045,826, filed on Sep. 4, 2014.

(51) Int. Cl.
*H04B 10/08* (2006.01)
*H04Q 11/00* (2006.01)
(Continued)

(52) U.S. Cl.
CPC ........ *H04Q 11/0067* (2013.01); *H04B 10/272* (2013.01); *H04J 14/0227* (2013.01); *H04J 14/08* (2013.01); *H04L 43/0864* (2013.01); *H04Q 2011/0016* (2013.01); *H04Q 2011/0033* (2013.01); *H04Q 2011/0083* (2013.01); *H04Q 2011/0086* (2013.01)

(58) Field of Classification Search
CPC ................. H04Q 11/0067; H04Q 2011/0016; H04Q 2011/0033; H04Q 2011/0083; H04Q 2011/0086; H04B 10/272; H04J 14/0227; H04J 14/08; H04L 43/0864
USPC .......................................................... 398/34
See application file for complete search history.

(56) References Cited

U.S. PATENT DOCUMENTS

| 9,025,949 | B2 * | 5/2015 | Khotimsky | .......... H04B 10/032 398/1 |
| 2010/0183316 | A1 * | 7/2010 | Gordon | .................. H04J 3/0682 398/149 |

(Continued)

OTHER PUBLICATIONS

International Telecommunication Union, "Gigabit-capable passive optical networks (GPON): General characteristics", Series G: Transmission Systems and Media, Digital Systems and Networks, Digital sections and digital line system—Optical line systems for local and access networks, Recommendation ITU-T G.984.1, Mar. 2008, 43 pages.

(Continued)

*Primary Examiner* — M. R. Sedighian

(57) ABSTRACT

A device determines a zero-distance equalization delay and an order for optical line terminal (OLT) channel terminations (CTs), and determines a round-trip propagation time between a first OLT CT, based on the order, and an optical network unit (ONU). The device determines an equalization delay based on the round-trip propagation time, and hands over the ONU to a next OLT CT. The device calculates a round-trip delay for the next OLT CT based on a propagation time between the next OLT CT and the ONU, a processing time of the ONU, and the equalization delay. The device compares the round-trip delay, for the next OLT CT, with the zero-distance equalization delay to obtain a comparison result, and alters the zero-distance equalization delay based on the comparison result. The device repeats the performing, the calculating, the comparing, and the altering for remaining OLT CTs.

20 Claims, 13 Drawing Sheets

(51) Int. Cl.
*H04B 10/272* (2013.01)
*H04L 12/26* (2006.01)
*H04J 14/08* (2006.01)
*H04J 14/02* (2006.01)

(56) References Cited

U.S. PATENT DOCUMENTS

2012/0020668 A1* 1/2012 Trojer ............... H04M 11/062
  398/115

2014/0161436 A1* 6/2014 Lee ..................... H04B 10/03
  398/1

OTHER PUBLICATIONS

International Telecommunication Union, "10-Gigabit-capable passive optical network (XG-PON) systems: Definitions, abbreviations and acronyms", Series G: Transmission Systems and Media, Digital Systems and Networks, Digital sections and digital line system—Optical line systems for local and access networks, Recommendation ITU-T G.987, Jun. 2012, 26 pages.

* cited by examiner

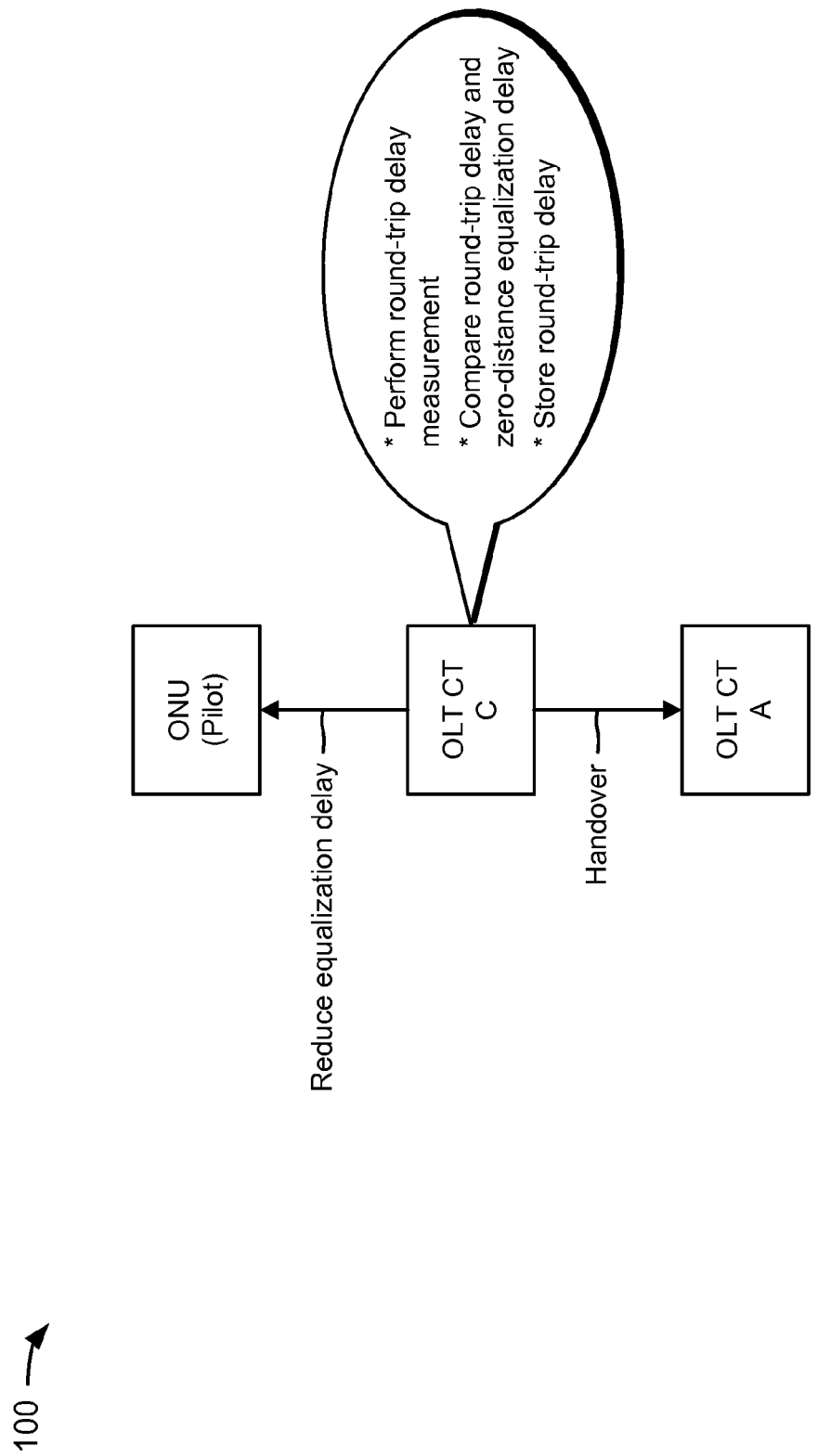

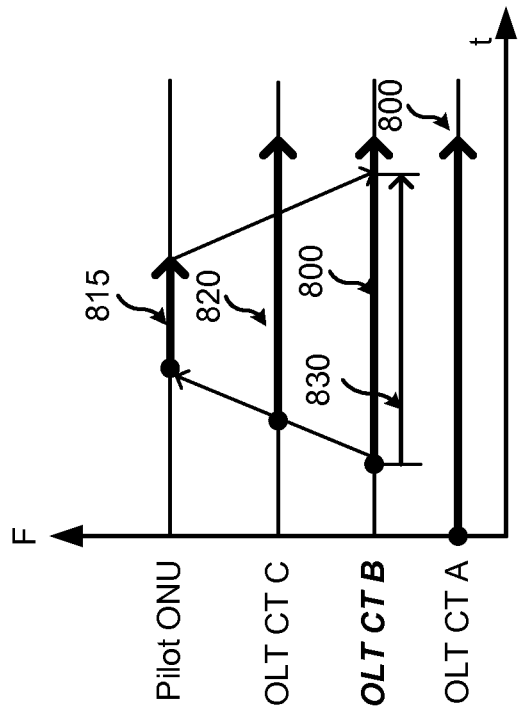
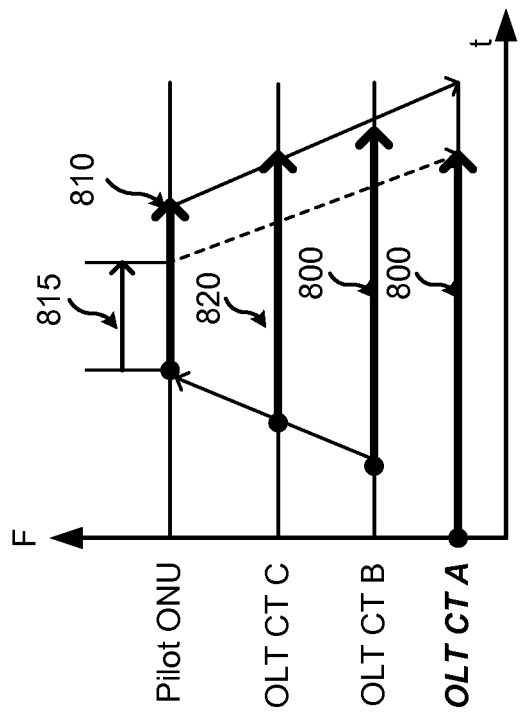

MAINTAINING CHANNEL-INVARIANT OPTICAL NETWORK UNIT (ONU) EQUALIZATION DELAY IN A PASSIVE OPTICAL NETWORK

RELATED APPLICATION

This application claims priority under 35 U.S.C. §119 to U.S. Provisional Patent Application No. 62/045,826, filed on Sep. 4, 2014, the content of which is incorporated by reference herein in its entirety.

BACKGROUND

A passive optical network (PON) may include an optical access network architecture based on a point-to-multipoint (P2MP) optical fiber topology with passive branching points. The optical fiber topology may be referred to as an optical distribution network (ODN). A PON system may utilize the optical distribution network to provide connectivity between multiple central nodes, known as optical line terminals (OLTs), and multiple user nodes, known as optical network units (ONUs). The ONUs may utilize multiple bi-directional wavelength channels, where each wavelength channel includes a downstream wavelength and an upstream wavelength.

BRIEF DESCRIPTION OF THE DRAWINGS

FIGS. 1A-1D are diagrams of an overview of an example implementation described herein;

FIGS. 8A-8E are diagrams of an example implementation relating to the example process shown in FIG. 4.

DETAILED DESCRIPTION OF PREFERRED EMBODIMENTS

Figure 1A:
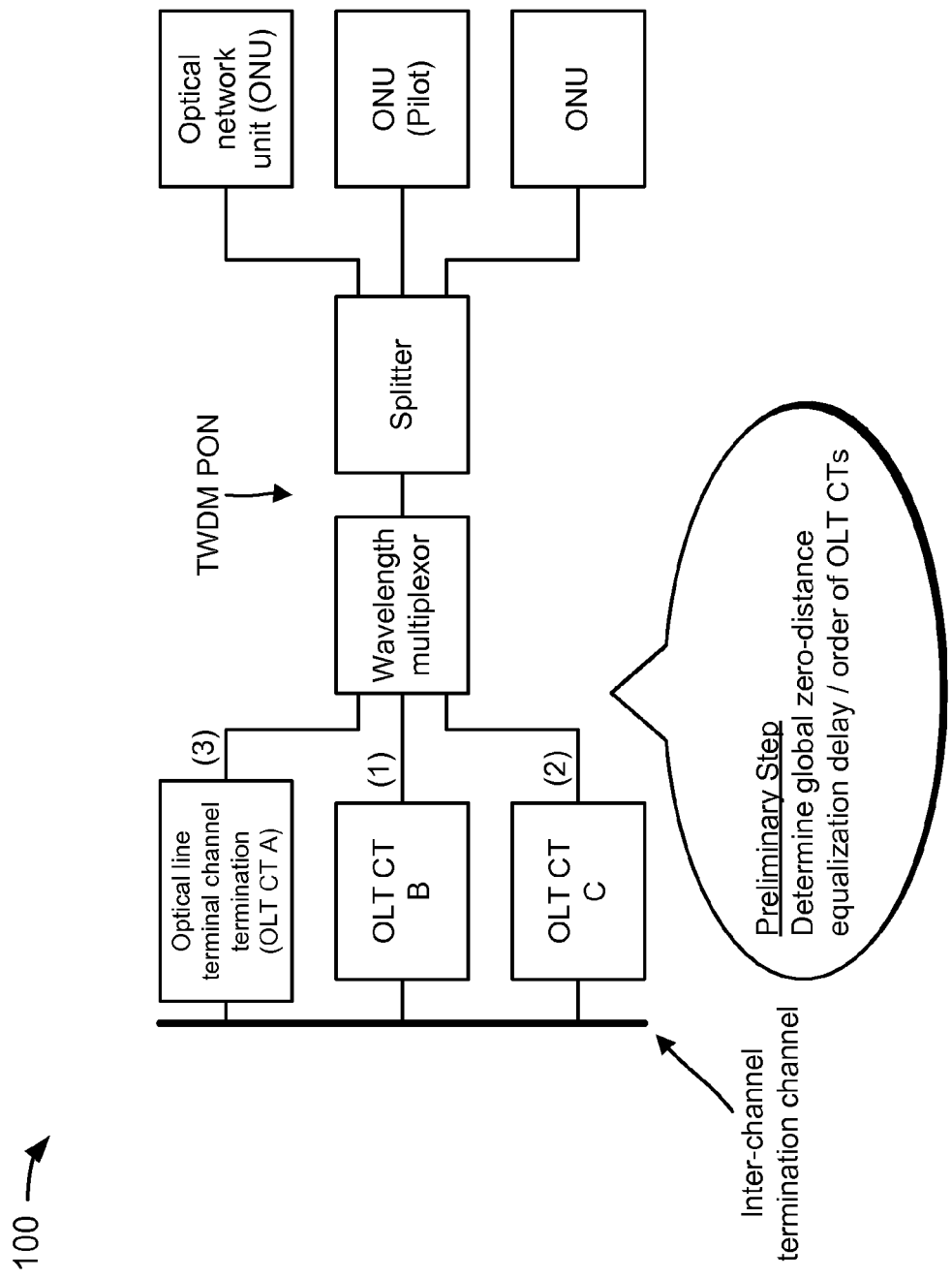

The following detailed description of example implementations refers to the accompanying drawings. The same reference numbers in different drawings may identify the same or similar elements.

In a single-wavelength, time-division multiplexing (TDM)/time-division multiple access (TDMA) PON system (e.g., a broadband PON (B-PON), a gigabit PON (G-PON), an asymmetric 10 gigabits PON (XG-PON1), or the like), each ONU may operate over a single fixed wavelength channel associated with a particular OLT channel termination (CT) over a single optical distribution network. The TDM/TDMA system may include a single OLT channel termination and multiple ONUs interconnected by an optical distribution network that includes an optical feeder fiber (also known as a trunk fiber), a splitter, and multiple distribution fibers. The TDM/TDMA PON system may operate over a single bi-directional wavelength channel, where each wavelength channel may include a fixed downstream wavelength and a fixed upstream wavelength. The ONUs may support the same fixed downstream and upstream wavelengths. Once a particular ONU is activated on the TDM/TDMA PON system, the particular ONU may interact with a unique OLT channel termination. Prior to transmitting upstream in the TDM/TDMA PON system, the particular ONU may have to learn parameters of an upstream burst (e.g., a preamble, delimiter sizes and patterns, or the like) that the OLT channel termination provides in a downstream broadcast management message.

In a time and wavelength division multiplexing (TWDM) PON system, an ONU may operate on multiple wavelength channels (e.g., one wavelength channel at a time). Each wavelength channel may be associated with a corresponding OLT channel termination, and the multiple wavelength channels may be multiplexed over a single optical distribution network. The OLT channel terminations that form the TWDM PON system may physically belong to the same module within a single OLT, to different modules within a single OLT, or to different OLTs.

The multiple ONUs in a TWDM PON system may operate on a particular wavelength channel at any given time and may utilize TDM/TDMA mechanisms. An ONU in a TWDM PON system may be instructed by the OLT channel termination to switch from an original wavelength channel to a new wavelength channel. When the OLT channel termination provides such instructions, the ONU may leave multiple ONUs associated with the original wavelength channel, may retune an optical transceiver to specified downstream and upstream wavelengths, and may join multiple ONUs associated with the new wavelength channel.

When an ONU is newly activated or reactivated on a TDM/TDMA PON system, the ONU may enter a discovery stage of an activation cycle. While in the discovery stage, the ONU may declare a presence to an OLT channel termination by providing a globally unique identifier of the ONU (i.e., a serial number, a media access control (MAC) address, or the like, depending on a standard), and may wait for assignment of an ODN-specific logical identifier (ID). Once the OLT channel termination assigns the logical ID to the ONU, the ONU may enter a ranging stage of the activation cycle. In the ranging stage, the ONU may be requested to perform one or more short upstream transmissions to allow the OLT channel termination to accurately measure a round-trip delay (e.g., a round-trip optical signal propagation time and a processing time) and to compute an equalization delay (e.g., extra time that the ONU may be required to delay transmission in order to compensate for differences in the round-trip propagation times between ONUs on the same optical distribution network). Once the individual equalization delay is assigned to the ONU, the ONU may enter a regular operation stage, and may remain in the regular operation stage until the ONU is reset (e.g., by a user), deactivated by the OLT channel termination, or disabled by the OLT channel termination. The activation cycle of an ONU may require time-consuming operations that cause service interruption for the activating ONU and for other ONUs operating on the same optical distribution network associated with the activating ONU.

For example, in a TWDM PON system, where multiple wavelength channels are associated with different OLT channel terminations, round-trip optical signal propagation times between each OLT channel termination and a particular ONU may differ for different wavelength channels. In such a TWDM PON system, switching of a wavelength channel by an ONU requires repeat ranging and causes service interruption for the ONU being repeat ranged, as well as for other ONUs operating over the same wavelength channel on the same optical distribution network.

Systems and/or methods, described herein, may enable invariant ONU equalization delay to be maintained across a plurality of wavelength channels in a TWDM PON system. This may eliminate timing overhead and service interruptions associated with the repeat ranging procedure that occurs when an ONU switches a wavelength channel. The systems and/or methods may extend capabilities of an access network, based on a multi-wavelength PON system, in order to isolate and mitigate behavior of a rogue ONU that transmits optical power via an optical distribution network outside a specification of a multiple access protocol.

FIGS. 1A-1D are diagrams of an overview of an example implementation 100 described herein. As shown in FIG. 1A, a multi-wavelength TWDM PON system may include multiple OLT channel terminations (e.g., OLT CT A, OLT CT B, and OLT CT C) that connect to a wavelength multiplexor with a channel attachment fiber. The multi-wavelength TWDM PON system may also include multiple ONUs that connect to a splitter via a distribution fiber and then to the wavelength multiplexor via a feeder fiber. Each OLT channel termination may be associated with a corresponding bi-directional wavelength channel that includes a fixed downstream wavelength and a fixed upstream wavelength. At any given time, each ONU may choose a single wavelength channel on which to operate and a single OLT channel termination on which to subordinate, and may switch wavelength channels, if instructed by a subordinate OLT channel termination. In some implementations, OLT channel terminations of the multi-wavelength TWDM PON system may belong to a same module within a single OLT network element, to different modules within a single OLT network element, or to different OLT network elements.

As further shown in FIG. 1A, the OLT channel terminations may communicate with each other via an inter-channel termination channel. In a preliminary step (e.g., before activating any of the ONUs), the OLT channel terminations may agree upon, via the communications, a global zero-distance equalization delay. A value of an equalization delay of a hypothetical ONU whose fiber distance that determines optical signal propagation time and the processing time are both zero may be referred to as a zero-distance equalization delay. Each OLT channel termination may initialize its specific value of the zero-distance equalization delay to the agreed value of a global zero-distance equalization delay. The OLT channel terminations may agree upon, via the communications, an order of the OLT channel terminations for performing functions, such as system initialization. For example, as shown in FIG. 1A, the order of the OLT channel terminations may include OLT CT B (e.g., as indicated by the 1), OLT CT C (e.g., as indicated by the 2), and OLT CT A (e.g., as indicated by the 3).

Figure 1B:
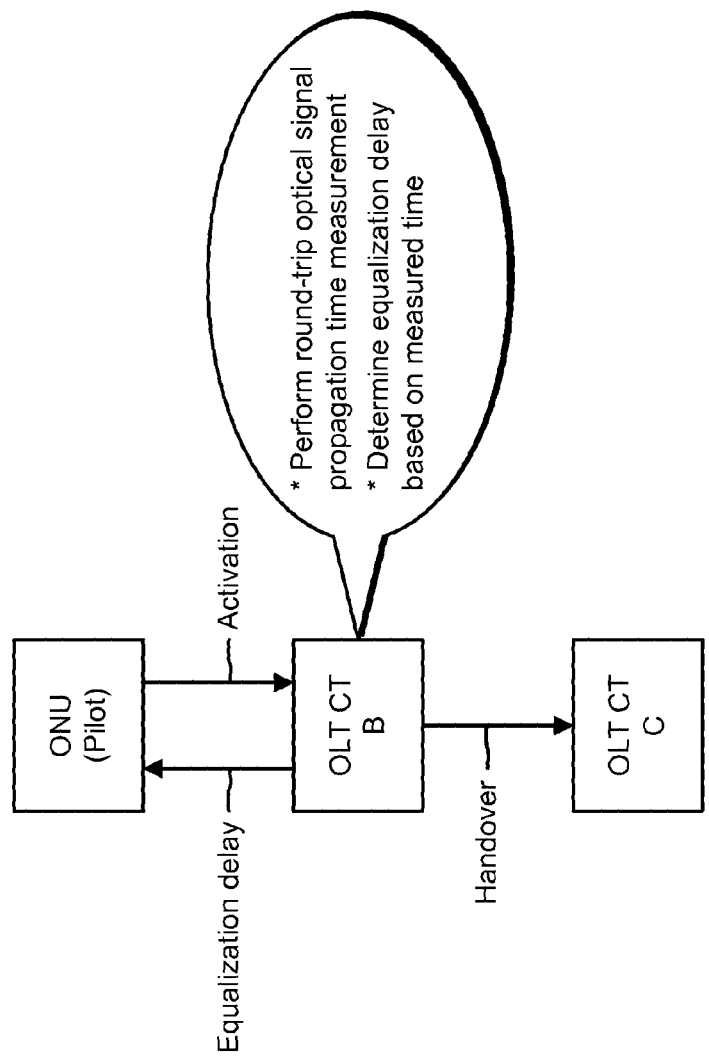

As shown in FIG. 1B, a first ONU that attempts to activate on the TWDM PON may be designated as a pilot ONU. The pilot ONU may provide an indication of the activation to the first OLT channel termination in the order (e.g., OLT CT B). OLT CT B may perform a measurement of a round-trip optical signal propagation time between the pilot ONU and OLT CT B, and may determine an equalization delay based on the round-trip optical signal propagation time. As further shown in FIG. 1B, OLT CT B may provide the determined equalization delay to the pilot ONU, and may execute a handover of the pilot ONU to a second OLT channel termination in the order (e.g., OLT CT C).

As shown in FIG. 1C, OLT CT C may perform a round-trip delay measurement that includes a round-trip optical signal propagation time, an ONU processing time, and the equalization delay previously provided to the pilot ONU. OLT CT C may compare the result of the round-trip delay measurement with the stored specific value. If the measured round-trip delay is greater than the stored value of the specific zero-distance equalization delay, OLT CT C may compute a difference between the two delays and may instruct the pilot ONU to reduce the equalization delay by a value of the computed difference. Otherwise, OLT CT C may store the measured round-trip delay as a new specific zero-distance equalization delay value. As further shown in FIG. 1C, OLT CT C may execute a handover of the pilot ONU to the next OLT channel termination in the order (e.g., OLT CT A).

Figure 1D:
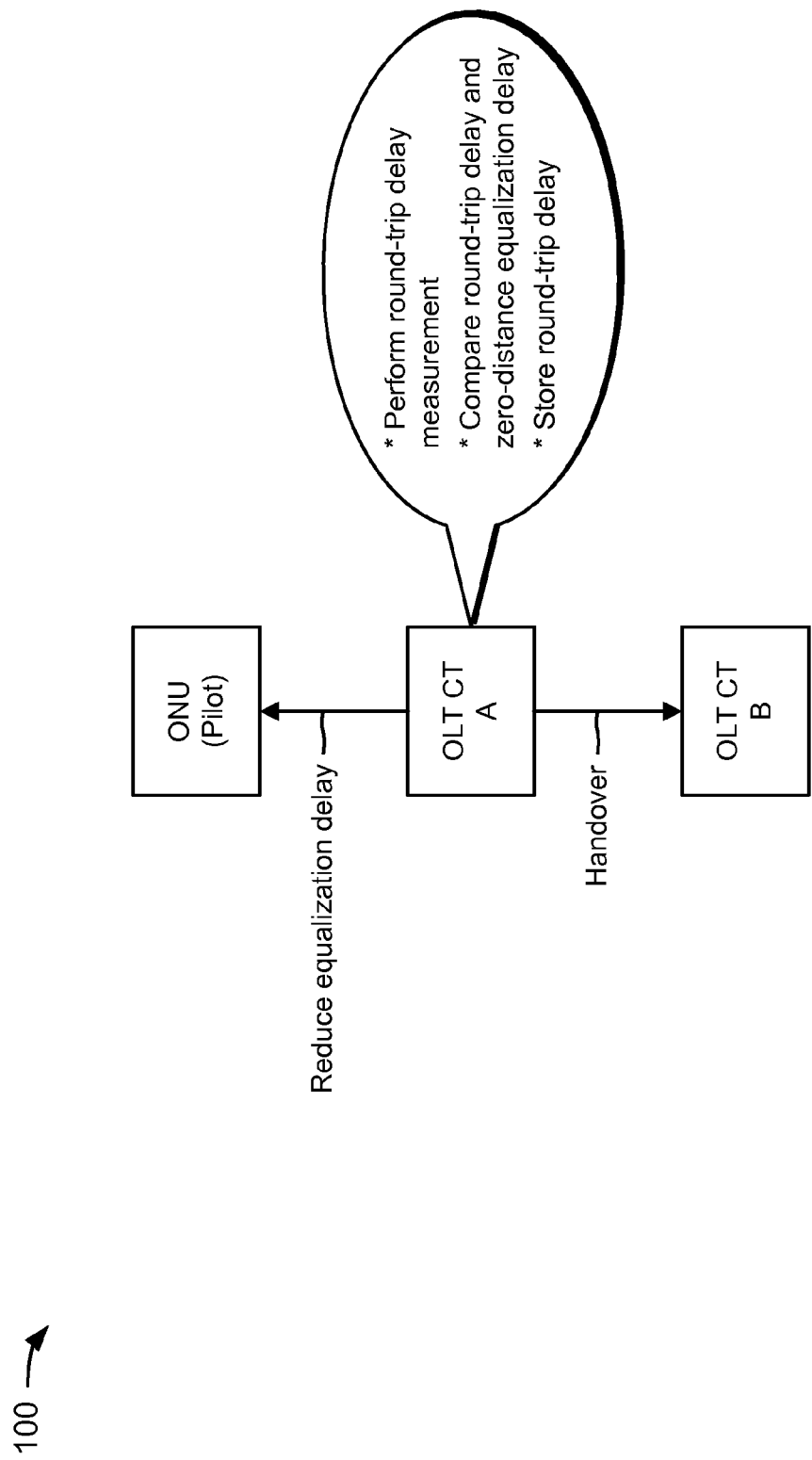

As shown in FIG. 1D, OLT CT A may perform a round-trip delay measurement that includes a round-trip optical signal propagation time, an ONU processing time, and the equalization delay previously assigned to the pilot ONU. OLT CT A may compare the result of the round-trip delay measurement with a stored specific zero-distance equalization delay. If the measured round-trip delay is greater than the stored value of the specific zero-distance equalization delay, OLT CT A may compute a difference between the two delays and may instruct the pilot ONU to reduce the equalization delay by a value of the computed difference. Otherwise, OLT CT A may store the measured round-trip delay as a new specific zero-distance equalization delay value. As further shown in FIG. 1D, OLT CT C may execute a handover of the pilot ONU to the next OLT channel termination in the order (e.g., back to OLT CT B). The OLT channel terminations may repeat the procedures described above in connection with FIGS. 1B-1D. When OLT CT B receives the handover of the pilot ONU a second time, instead of performing a handover to the next OLT channel termination in the order, OLT CT B may handover the pilot ONU to a target TWDM channel. With that handover, the procedure may terminate, and the pilot ONU may lose pilot status.

Systems and/or methods, described herein, may maintain invariant ONU equalization delay across the multiple wavelength channels in a TWDM PON system and, therefore, may avoid the timing overhead and service interruptions associated with the need to perform a repeat ranging procedure when an ONU switches from one wavelength channel to another wavelength channel.

Figure 2:
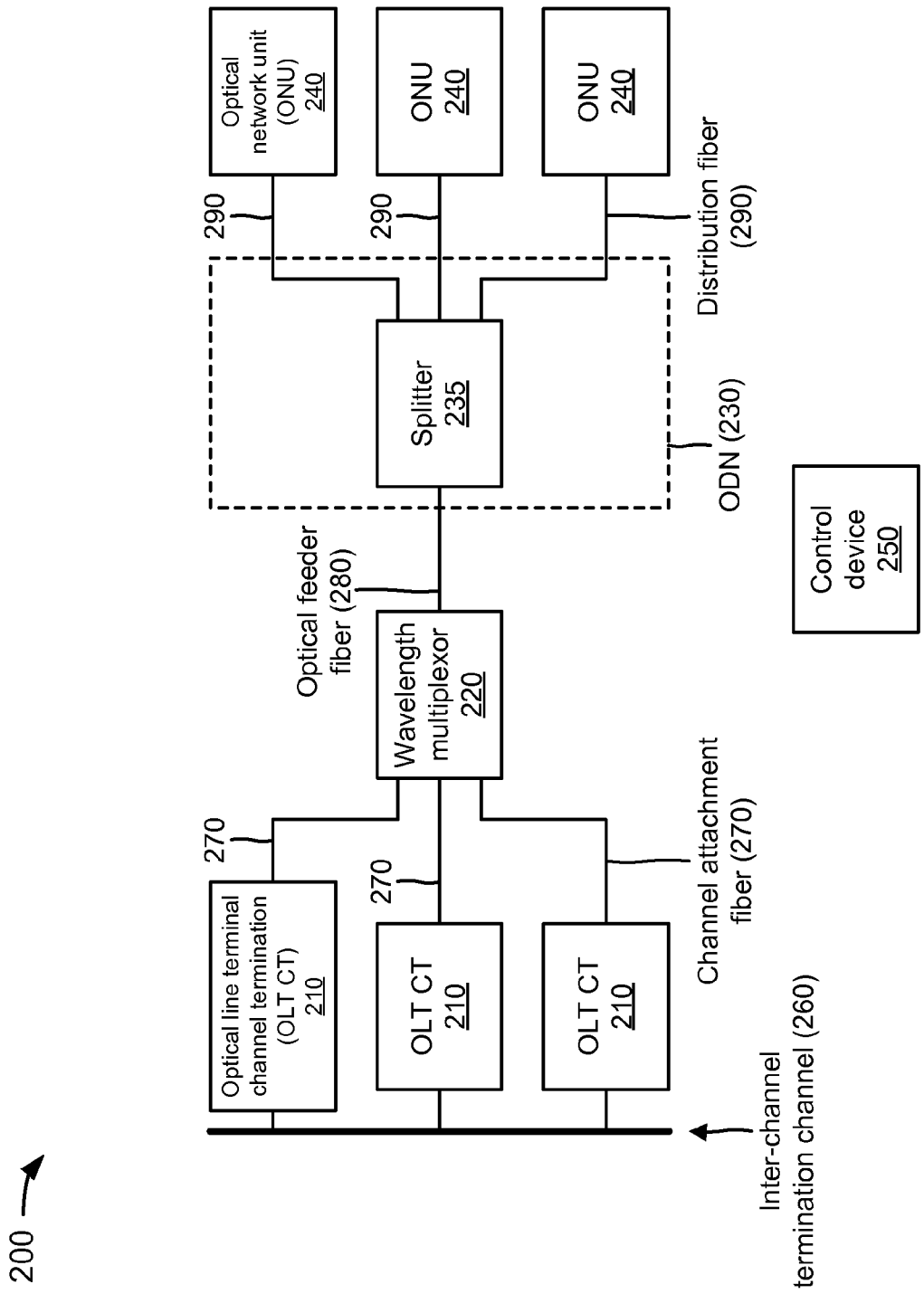
FIG. 2 is a diagram of an example environment in which systems and/or methods, described herein, may be implemented.

FIG. 2 is a diagram of an example environment 200 in which systems and/or methods, described herein, may be implemented. As shown in FIG. 2, environment 200 may include optical line terminal (OLT) channel terminations (CTs) 210, a wavelength multiplexor 220, an optical distribution network (ODN) 230, a splitter 235, optical network units (ONUs) 240, and a control device 250. In some implementations, environment 200 may correspond to a TWDM PON system. Devices and/or networks of environment 200 may interconnect via wired connections, wireless connections, or a combination of wired and wireless connections.

OLT channel termination 210 may include a device that serves as a service provider endpoint of a passive optical network (e.g., environment 200). In some implementations, OLT channel termination 210 may perform conversion between electrical signals used by a service provider's equipment and fiber optic signals used by the passive optical network. In some implementations, OLT channel termination 210 may coordinate multiplexing between conversion devices on the other end of the passive optical network (e.g., ONUs 240). In some implementations, to support operation and maintenance functionality of environment 200 (e.g., status sharing, ONU 240 activation, ONU 240 wavelength channel switching, protection switching, rogue ONU 240 mitigation, or the like), OLT channel terminations 210 may interconnect via an inter-channel termination channel 260 and may utilize an inter-channel termination protocol (ICTP). In some implementations, inter-channel termination channel 260 may be provided within a single OLT module, between modules of a single OLT, or between different OLTs.

In some implementations, each OLT channel termination 210 may be associated with a corresponding bi-directional wavelength channel that includes a fixed downstream wavelength and a fixed upstream wavelength. In some implementations, OLT channel terminations 210 may belong to a same module within a single OLT, to different modules within a single OLT, or to different OLTs.

Wavelength multiplexor 220 may include a device that multiplexes a number of optical carrier signals onto a single optical fiber by using different wavelengths (e.g., colors) of laser light. In some implementations, wavelength multiplexor 220 may enable bidirectional communications over one strand of fiber, as well as multiplication of capacity. In some implementations, each OLT channel termination 210 may connect to wavelength multiplexor 220 with a channel attachment fiber 270.

Optical distribution network 230 may include links (e.g., physical fiber) and optical devices that distribute optical signals to users in a PON. In some implementations, optical distribution network 230 may utilize single mode optical fiber, optical splitters, and/or optical distribution frames that are duplexed so that upstream and downstream signals share the same fiber on separate wavelengths. In some implementations, optical distribution network 230 may include splitter 235, an optical feeder fiber 280, and distribution fibers 290. Optical feeder fiber 280 may connect wavelength multiplexor 220 and splitter 235, and each distribution fiber 290 may connect a corresponding ONU 240 to splitter 235.

Splitter 235 may include an optical device that splits an optical signal (e.g., broadcast or downstream traffic provided by OLT channel terminations 210) into multiple optical signals. For example, in some implementations, splitter 235 may receive a single optical signal (e.g., broadcast or downstream traffic) from wavelength multiplexor 220, may split the optical signal into three optical signals, and may provide the three optical signals to one or more of ONUs 240. In some implementations, splitter 235 may receive one or more optical signals (e.g., upstream traffic) from ONUs 240 (e.g., one from each ONU 240), and may pass the one or more optical signals as a single optical signal to wavelength multiplexor 220.

ONU 240 may include a device that terminates a PON (e.g., environment 200), and provides an interface between the PON and the customer's premises. In some implementations, ONU 240 may provide multiple service interfaces for the customer (e.g., an interface for voice services, an interface for data services, an interface for television services, or the like). ONUs 240 may receive information (e.g., from control device 250 or the like), and/or may send the information as upstream traffic (e.g., optical signals) to OLT channel terminations 210. ONUs 240 may receive downstream traffic provided by OLT channel terminations 210, and/or may send the downstream traffic to devices provided at the customer's premises. In some implementations, each ONU 240 may choose a single wavelength channel on which to operate and a single OLT channel termination 210 on which to subordinate, and may switch wavelength channels, if instructed by a respective OLT channel termination 210.

In some implementations, each OLT channel termination 210 and ONU 240 pair may be characterized by a corresponding fiber distance. The corresponding fiber distance may include a total length of fiber segments between the OLT channel termination 210 and ONU 240 pair (e.g., channel attachment fiber 270, optical feeder fiber 280, distribution fiber 290, and an equivalent fiber segment that simulates a delay across passive optical elements between the OLT channel termination 210 and ONU 240 pair). Since channel attachment fiber 270 is specific to a particular OLT channel termination 210, and distribution fiber 290 is specific to a particular ONU 240, the corresponding fiber distance may generally be unique for each OLT channel termination 210 and ONU 240 pair. An optical signal propagation time between the OLT channel termination 210 and ONU 240 pair may be proportional to the corresponding fiber distance. A maximum possible fiber distance in environment 200 may be established by a corresponding standard (e.g., in advance) as a design parameter. In some implementations, the maximum possible fiber distances may include 10 kilometers (km), 20 km, 30 km, 40 km, 50 km, or the like.

Control device 250 may include one or more personal computers, one or more workstation computers, one or more server devices, one or more virtual machines (VMs) provided in a cloud computing environment, or one or more other types of computation and communication devices. In some implementations, control device 250 may be associated with an entity that manages and/or operates environment 200, such as, for example, a network service provider, a telecommunication service provider, a television service provider, an Internet service provider, or the like. In some implementations, control device 250 may configure environment 200 so that environment 200 may provide services to customers and/or may provide customers with access to data and/or technology resources.

The number and arrangement of devices and/or networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
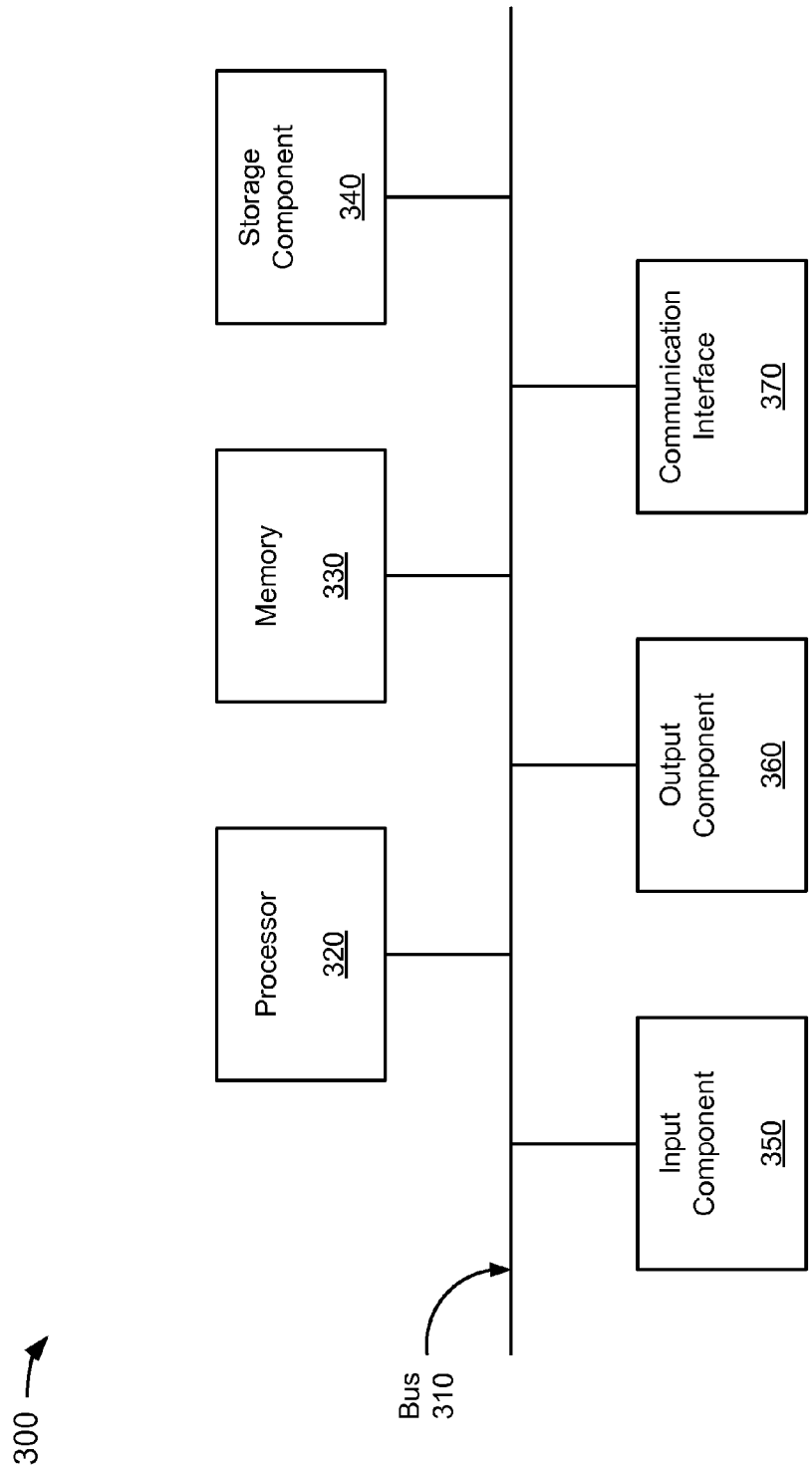
FIG. 3 is a diagram of example components of one or more devices of FIG. 2.

FIG. 3 is a diagram of example components of a device 300. Device 300 may correspond to OLT channel termination 210, wavelength multiplexor 220, splitter 235, ONU 240, and/or control device 250. In some implementations, OLT channel termination 210, wavelength multiplexor 220, splitter 235, ONU 240, and/or control device 250 may include one or more devices 300 and/or one or more components of device 300. As shown in FIG. 3, device 300 may include a bus 310, a processor 320, a memory 330, a storage component 340, an input component 350, an output component 360, and a communication interface 370.

Bus 310 may include a component that permits communication among the components of device 300. Processor 320 is implemented in hardware, firmware, or a combination of hardware and software. Processor 320 may include a processor (e.g., a central processing unit (CPU), a graphics processing unit (GPU), an accelerated processing unit (APU), etc.), a microprocessor, and/or any processing component (e.g., a field-programmable gate array (FPGA), an application-specific integrated circuit (ASIC), etc.) that interprets and/or executes instructions. Memory 330 may include a random access memory (RAM), a read only memory (ROM), and/or another type of dynamic or static storage device (e.g., a flash memory, a magnetic memory, an optical memory, etc.) that stores information and/or instructions for use by processor 320.

Storage component 340 may store information and/or software related to the operation and use of device 300. For example, storage component 340 may include a hard disk (e.g., a magnetic disk, an optical disk, a magneto-optic disk, a solid state disk, etc.), a compact disc (CD), a digital versatile disc (DVD), a floppy disk, a cartridge, a magnetic tape, and/or another type of computer-readable medium, along with a corresponding drive.

Input component 350 may include a component that permits device 300 to receive information, such as via user input (e.g., a touch screen display, a keyboard, a keypad, a mouse, a button, a switch, a microphone, etc.). Additionally, or alternatively, input component 350 may include a sensor for sensing information (e.g., a global positioning system (GPS) component, an accelerometer, a gyroscope, an actuator, etc.). Output component 360 may include a component that provides output information from device 300 (e.g., a display, a speaker, one or more light-emitting diodes (LEDs), etc.).

Communication interface 370 may include a transceiver-like component (e.g., a transceiver, a separate receiver and transmitter, etc.) that enables device 300 to communicate with other devices, such as via a wired connection, a wireless connection, or a combination of wired and wireless connections. Communication interface 370 may permit device 300 to receive information from another device and/or provide information to another device. For example, communication interface 370 may include an Ethernet interface, an optical interface, a coaxial interface, an infrared interface, a radio frequency (RF) interface, a universal serial bus (USB) interface, a Wi-Fi interface, a cellular network interface, or the like.

Device 300 may perform one or more processes described herein. Device 300 may perform these processes in response to processor 320 executing software instructions stored by a computer-readable medium, such as memory 330 and/or storage component 340. A computer-readable medium is defined herein as a non-transitory memory device. A memory device includes memory space within a single physical storage device or memory space spread across multiple physical storage devices.

Software instructions may be read into memory 330 and/or storage component 340 from another computer-readable medium or from another device via communication interface 370. When executed, software instructions stored in memory 330 and/or storage component 340 may cause processor 320 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 3 are provided as an example. In practice, device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

Figure 4:
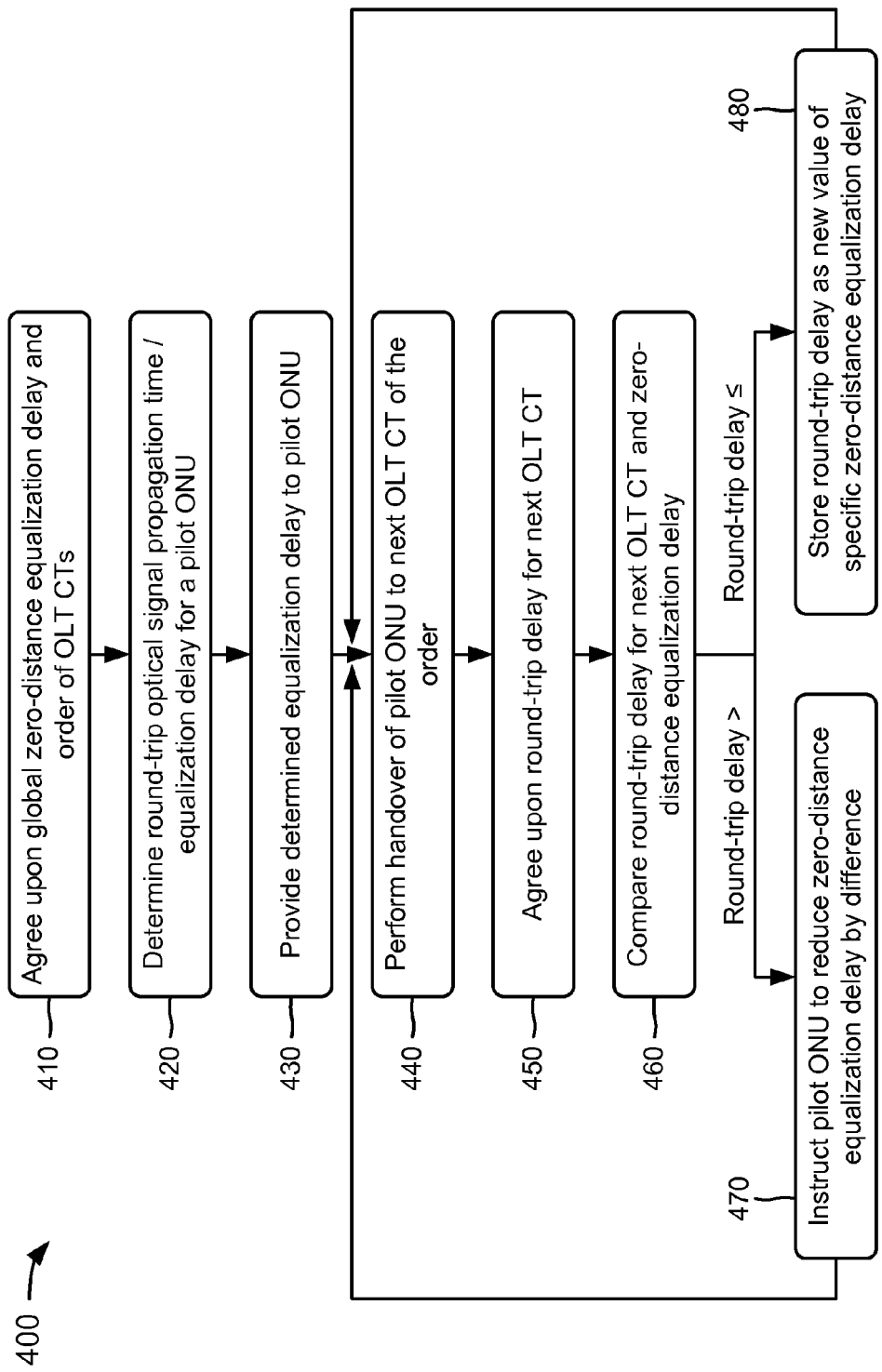
FIG. 4 is a flow chart of an example process for maintaining channel-invariant ONU equalization delay in a PON.

FIG. 4 is a flow chart of an example process 400 for maintaining channel-invariant ONU equalization delay in a PON. In some implementations, one or more process blocks of FIG. 4 may be performed by OLT channel termination 210. In some implementations, one or more process blocks of FIG. 4 may be performed by another device or a set of devices separate from or including OLT channel termination 210, such as optical distribution network 230, ONU 240, and/or control device 250.

In some implementations, equalization delay incompatibility between different OLT channel terminations 210 in a single TWDM PON system may be eliminated by ensuring that channel attachment fibers 270 connecting wavelength multiplexor 220 to OLT channel terminations 210 have exactly the same length. In some implementations, if the lengths of channel attachment fibers 270 are different and known in advance, a specific set of zero-distance equalization delays (e.g., that match the known lengths of channel attachment fibers 270) may be determined and provisioned to respective OLT channel terminations 210. In some implementations, when the lengths of channel attachment fibers 270 are different and are not known in advance, the following use cases may occur: initial activation of a TWDM PON system with a set of OLT channel terminations 210; addition of an OLT channel termination 210 to an active TWDM PON system; and merging of two active TWDM PON system partitions that each include a set of OLT channel terminations 210.

Process 400 of FIG. 4 may include the steps associated with the initial activation of a TWDM PON system use case. The steps associated with the addition of an OLT channel termination 210 use case and the merging of two active TWDM PON system partitions use case are described further below (e.g., after the steps of process 400 are described).

As shown in FIG. 4, process 400 may include agreeing upon a global zero-distance equalization delay and an order of OLT channel terminations (block 410). For example, OLT channel terminations 210 and/or control device 250 may agree upon a global zero-distance equalization delay and an order of OLT channel terminations 210 (e.g., for performing functions). In some implementations, during the initial activation of a TWDM PON system and before activating any of ONUs 240, OLT channel terminations 210 may utilize inter-channel termination channel 260 to agree upon a global zero-distance equalization delay and an order of OLT channel terminations 210 (e.g., for performing functions). In some implementations, the global zero-distance equalization delay may depend on a maximum fiber distance (e.g., a design parameter) associated with optical distribution network 230. In some implementations, the order of OLT channel terminations 210 may be derived, for example, from serial numbers of OLT channel terminations 210, randomization, or the like. In such implementations, a last OLT channel termination 210 in the order may be considered to precede a first OLT channel termination 210 in the order. Thus, the order may impose a logical ring on the set of OLT channel terminations 210. In some implementations, each OLT channel termination 210 may set a specific zero-distance equalization delay to an agreed value of the global zero-distance equalization delay. In some implementations, when a first ONU 240 attempts activation with a first OLT channel termination 210 on the TWDM PON system, the activating ONU 240 may be designated as a pilot ONU 240.

As further shown in FIG. 4, process 400 may include determining a round-trip optical signal propagation time and an equalization delay for a pilot ONU (block 420). For example, the first OLT channel termination 210 and/or control device 250 may determine a round-trip optical signal propagation time and an equalization delay associated with the first OLT channel termination 210 and the pilot ONU 240. In some implementations, the first OLT channel termination 210, with which the pilot ONU 240 attempts to activate, may perform a measurement of the round-trip optical signal propagation time between the first OLT channel termination 210 and the pilot ONU 240. In such implementations, the first OLT channel termination 210 may determine the equalization delay based on the round-trip optical signal propagation time.

As further shown in FIG. 4, process 400 may include providing the determined equalization delay to the pilot ONU (block 430). For example, the first OLT channel termination 210 may provide the determined equalization delay to the pilot ONU 240. In some implementations, control device 250 may provide the determined equalization delay to the pilot ONU 240.

As further shown in FIG. 4, process 400 may include performing a handover of the pilot ONU to a next OLT channel termination of the order (block 440). For example, the first OLT channel termination 210 may execute a handover of the pilot ONU 240 to a second OLT channel termination 210 in the order. In some implementations, during the handover, the second OLT channel termination 210 may establish communication with the pilot ONU 240 and the first OLT channel termination 210 may cease communication with the pilot ONU 240. In some implementations, control device 250 may instruct the pilot ONU 240 to switch communication from the first OLT channel termination 210 to the second OLT channel termination 210. In such implementations, the pilot ONU 240 may switch communication from the first OLT channel termination 210 to the second OLT channel termination 210 based on the instruction from control device 250.

As further shown in FIG. 4, process 400 may include agreeing upon a round-trip delay for the next OLT channel termination (block 450). For example, the second OLT channel termination 210 and/or control device 250 may agree upon a round-trip delay associated with the second OLT channel termination 210 and the pilot ONU 240. In some implementations, the second OLT channel termination 210 and/or control device 250 may perform a measurement of the round-trip delay between the second OLT channel termination 210 and the pilot ONU 240. In some implementations, the round-trip delay measurement may include a round-trip optical signal propagation time associated with the second OLT channel termination 210 and the pilot ONU 240, a processing time associated with the pilot ONU 240, and the equalization delay previously provided to the pilot ONU 240.

As further shown in FIG. 4, process 400 may include comparing the round-trip delay for the next OLT channel termination and the zero-distance equalization delay (block 460). For example, the second OLT channel termination 210 and/or control device 250 may compare the round-trip delay measurement and a stored value of a specific zero-distance equalization delay. In some implementations, the second OLT channel termination 210 and/or control device 250 may determine that the measured round-trip delay is greater than the stored value of the specific zero-distance equalization delay. In some implementations, the second OLT channel termination 210 and/or control device 250 may determine that the measured round-trip delay is less than or equal to the stored value of the specific zero-distance equalization delay.

As further shown in FIG. 4, if the round-trip delay for the next OLT channel termination is greater than the zero distance equalization delay (block 460—Round-trip delay>), process 400 may include instructing the pilot ONU to reduce the zero-distance equalization delay by the difference (block 470) and returning to block 440. For example, if the second OLT channel termination 210 and/or control device 250 determines that the measured round-trip delay is greater than the stored value of the specific zero-distance equalization delay, the second OLT channel termination 210 and/or control device 250 may determine a difference between the measured round-trip delay and the specific zero-distance equalization delay. In some implementations, the second OLT channel termination 210 and/or control device 250 may instruct the pilot ONU 240 to reduce the zero-distance equalization delay by a value of the determined difference.

In some implementations, the second OLT channel termination 210 may execute a handover of the pilot ONU 240 to a third OLT channel termination 210 in the order. In some implementations, during the handover, the third OLT channel termination 210 may establish communication with the pilot ONU 240 and the second OLT channel termination 210 may cease communication with the pilot ONU 240. In some implementations, control device 250 may instruct the pilot ONU 240 to switch communication from the second OLT channel termination 210 to the third OLT channel termination 210. In such implementations, the pilot ONU 240 may switch communication from the second OLT channel termination 210 to the third OLT channel termination 210 based on the instruction from control device 250.

As further shown in FIG. 4, if the round-trip delay for the next OLT channel termination is less than or equal to the zero distance equalization delay (block 460—Round-trip delay≤), process 400 may include storing the round-trip delay as a new value of the specific zero-distance equalization delay (block 480) and returning to block 440. For example, if the second OLT channel termination 210 and/or control device 250 determines that the measured round-trip delay is less than or equal to the stored value of the specific zero-distance equalization delay, the second OLT channel termination 210 and/or control device 250 may store the measured round-trip delay as the zero-distance equalization delay.

In some implementations, the second OLT channel termination 210 may execute a handover of the pilot ONU 240 to the third OLT channel termination 210 in the order, as described above. In some implementations, the handover may be executed twice by each OLT channel termination 210 of the TWDM PON system so that the pilot ONU 240 is handed over twice along the ring of OLT channel terminations 210. In some implementations, process 400 may cease when the first OLT channel termination 210, with which the pilot ONU 240 initially activated, completes the second handover for the pilot ONU 240. Instead of performing a handover to the next OLT channel termination 210 in the order, the first OLT channel termination 210 may handover the pilot ONU 240 to a target TWDM channel and the pilot ONU 240 may lose pilot status. In some implementations, each OLT channel termination 210 executing the handover may receive a response from the pilot ONU 240 within a response time window that includes two global zero-distance equalization delays. In some implementations, the response time window may be reduced by providing the determined equalization delay to OLT channel terminations 210 in the order.

In some implementations, process 400 may enable OLT channel terminations 210 of a TWDM PON system to automatically select a consistent set of zero-distance equalization delays (e.g., that match a set of channel attachment fiber lengths). Process 400 may also permit a zero-distance equalization delay assigned by any OLT channel termination 210 of the TWDM PON system to be applicable to any other OLT channel termination 210 in the TWDM PON system, which may decrease the timing associated with handing over ONU 240 from one OLT channel termination 210 to another OLT channel termination 210.

In some implementations, process 400 may be executed during initialization of the TWDM PON system and/or periodically after initialization of the TWDM PON system (e.g., after a system failure, a service outage, or the like). In some implementations, once process 400 is executed, the zero-distance equalization delays of OLT channel terminations 210 may become aligned, so that an equalization delay of any individual ONU 240 determined by a particular OLT channel termination 210, based on a zero-distance equalization delay of the particular OLT channel termination 210, may be applicable to any other OLT channel termination 210 in the TWDM PON system. Thus, after execution of process 400, any ONU 240 handover from one OLT channel termination 210 to another OLT channel termination 210 may provide a data point for alignment accuracy verification. In some implementations, OLT channel termination 210 may compare drift in a new response from ONU 240 to a projected ideal time, and may perform statistics on the new response in order to qualify the new response.

In some implementations, the drift may be present even if ONU 240 is ranged several times in a row on the same OLT channel termination 210. An amplitude of the drift may depend on several factors (e.g., ONU 240 design, OLT channel termination 210 design, or the like) and may bounded by a particular number. In some implementations, if a mean of the drift associated with ONU 240 handover from a source OLT channel termination 210 to a target OLT channel termination 210 is approximately equal to zero, the target OLT channel termination 210 may adjust the equalization delay of each ONU 240 to compensate for the drift. If the mean of the drift is not approximately equal to zero, the target OLT channel termination 210 may adjust its zero distance equalization delay and the equalization delays of the attached ONUs 240.

In some implementations, the addition of an OLT channel termination 210 to an active TWDM PON system use case may arise, for example, in a pay-as-you-grow deployment (e.g., when an extra OLT channel termination 210 is installed and included in an already operational TWDM PON system). The operational TWDM PON system may include multiple active OLT channel terminations 210 and subtending active ONUs 240. In some implementations, the active OLT channel terminations 210 may agree on an identity of a pilot ONU 240 that can be used to connect with the new OLT channel termination 210 and inform the new OLT channel termination 210 of the value of the global zero-distance equalization delay. The new OLT channel termination 210 may set a specific zero-distance equalization delay to the value of the global zero-distance equalization delay. The pilot ONU 240 may be instructed (e.g., by control device 250) to tune to a TWDM channel associated with the new OLT channel termination 210.

In some implementations, the new OLT channel termination 210 may receive a handover of the pilot ONU 240 from a source OLT channel termination 210, and may perform the round-trip delay measurement. The round-trip delay measurement may include a round-trip optical signal propagation time between the new OLT channel termination 210 and the pilot ONU 240, a processing time associated with the pilot ONU 240, and a previously assigned equalization delay associated with the pilot ONU 240. If the round-trip delay measurement is less than the specific zero-distance equalization delay, the new OLT channel termination 210 may adjust the specific zero-distance equalization delay to the measured round-trip delay value and may immediately join the TWDM PON system. If the round-trip delay measurement is greater than or equal to the specific zero-distance equalization delay, the new OLT channel termination 210 may provide, to the source OLT channel termination 210, a value of a difference between the measured round-trip delay and the specific zero-distance equalization delay. In some implementations, the active OLT channel terminations 210 may share the value of the difference over inter-channel termination channel 260, and each active OLT channel termination 210 may provide, to subtending ONUs 240, a global instruction to reduce respective equalization delays by the value of the difference.

In some implementations, the merging of two active TWDM PON system partitions use case may arise, for example, when two previously active but disjoint TWDM PON system partitions commence joint operations on the same fiber. In such a use case, TWDM channels of one TWDM PON system partition may become available for ONUs 240 of the other TWDM PON system partition. In some implementations, OLT channel terminations 210 of both TWDM PON system partitions may agree on an identity of a pilot ONU 240 that can be used to establish mutual consistency of equalization delays on the joint TWDM PON system. The pilot ONU 240 may be instructed (e.g., by control device 250) to tune from a first representative TWDM channel within the first TWDM PON system partition to a second representative TWDM channel within the second TWDM PON system partition.

In some implementations, a representative OLT channel termination 210 associated with the second representative TWDM channel within the second TWDM PON system partition may perform a round-trip delay measurement. Since the second TWDM PON system partition may be in active operation, performing the round-trip delay measurement may include opening a quiet response time window. In some implementations, a size of the quiet response time window may be set to be twice the global zero-distance equalization delay. In some implementations, a reduced size of the quiet response time window may be established as long as additional information is exchange between the representative OLT channel terminations 210 of the two partitions.

If a difference between the measured round-trip delay of the pilot ONU 240 and the specific zero-distance equalization delay of the representative OLT channel termination 210 within the second TWDM PON system partition is positive, the equalization delays of all ONUs 240 within the first TWDM PON system partition may be reduced by the difference. If the difference between the measured round-trip delay of the pilot ONU 240 and the specific zero-distance equalization delay of the representative OLT channel termination 210 within the second TWDM PON system partition is negative, the equalization delays of all ONUs 240 within the second TWDM PON system partition may be reduced by an absolute value of the difference.

In some implementations, OLT channel terminations 210 of a TWDM system partition, which is the target for equalization delay adjustment, may distribute the adjustment value (e.g., the difference or the absolute value of the difference) over inter-channel termination channel 260, and each OLT channel termination 210 may provide, to subtending ONUs 240, a global instruction to reduce respective equalization delays by the adjustment value.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

Figure 5:
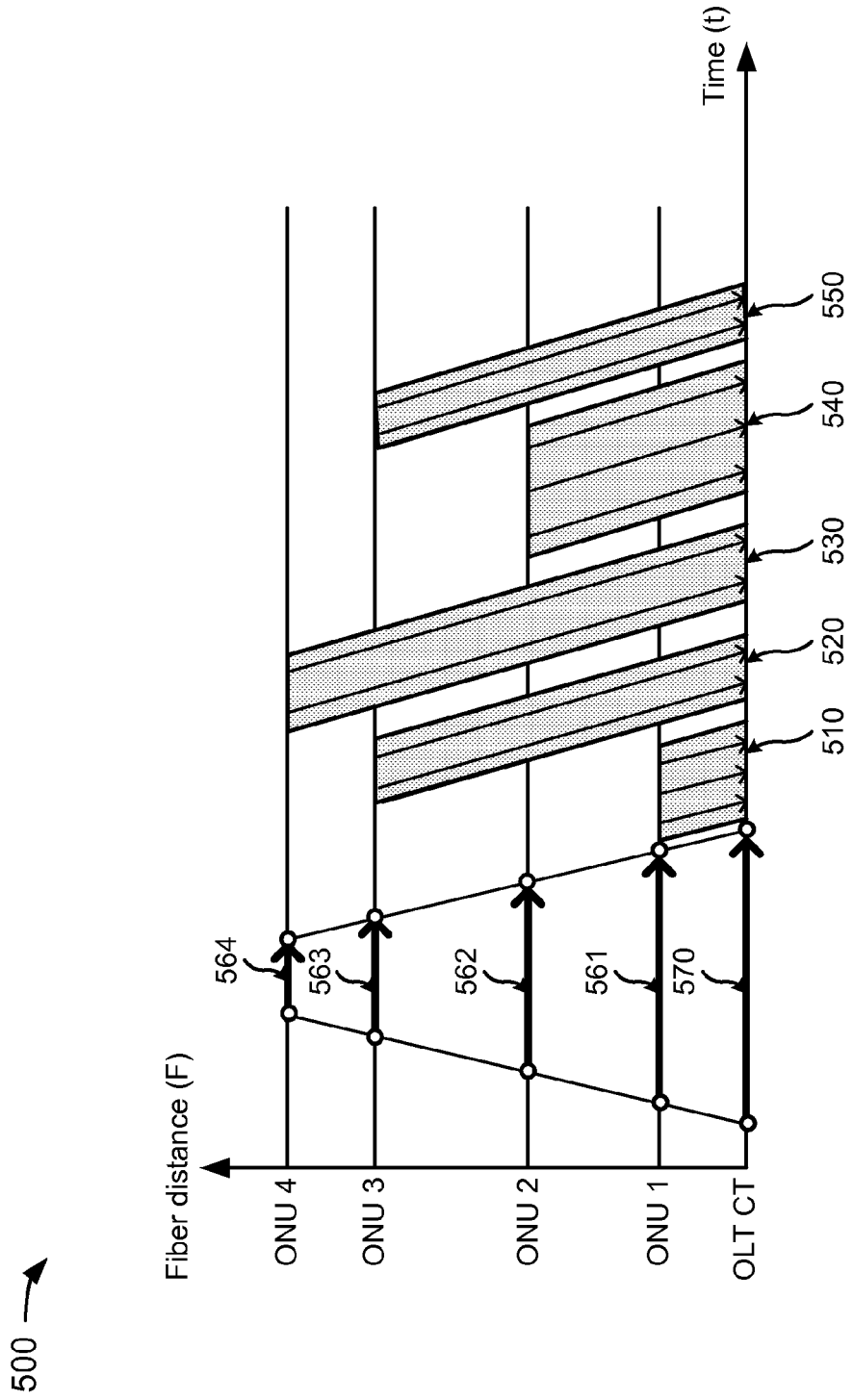
FIG. 5 is a diagram of an example time-division multiple access (TDMA) mechanism and an example equalization delay concept.

FIG. 5 is a diagram 500 of an example TDMA mechanism and an example equalization delay concept. In a TDM/TDMA PON system, an upstream transmission by ONUs 240 may be controlled by a TDMA mechanism. OLT channel termination 210 may direct the upstream transmissions by active ONUs 240 in such a way that the upstream transmission bursts of different ONUs 240 (e.g., an upstream burst 510 of a first ONU 240 (ONU 1), upstream bursts 520 and 550 of a third ONU 240 (ONU 3), an upstream burst 530 of a fourth ONU 240 (ONU 4), and an upstream burst 540 of a second ONU 240 (ONU 2)) may arrive at OLT channel termination 210 serially and may be received without interfering with each other. To ensure that OLT channel termination 210 can control ONUs 240 in that way, each ONU 240 may be activated a particular way (e.g., assigned a link-specific address and a value of equalization delay).

To establish a value of an equalization delay for ONU 240, OLT channel termination 210 may perform a measurement of a round-trip optical signal propagation time, and may determine an extra delay for which ONU 240 may hold a response in order to ensure that an effective round-trip delay (e.g., including an extra equalization delay) is identical for all ONUs 240. OLT channel termination 210 may communicate the computed value of the equalization delay to ONU 240. The process of round-trip optical signal propagation time measurement and equalization delay assignment may be referred to as ranging. For each ranged ONU 240, OLT channel termination 210 may measure a round-trip optical signal propagation time for ONU 240, and may assign an equalization delay to compensate for a difference in the round-trip times. For example, as shown in FIG. 5, a delay 561 may be an equalization delay for ONU 1, a delay 562 may be an equalization delay for ONU 2, a delay 563 may be an equalization delay for ONU 3, and a delay 564 may be an equalization delay for ONU 4.

In some implementations, a value of an equalization delay of a hypothetical ONU 240 whose fiber distance and optical signal propagation time are both zero may be referred to as a zero-distance equalization delay 570 (e.g., as shown in FIG. 5) or an upstream physical frame offset. A value of zero-distance equalization delay 570 may be selected by OLT channel termination 210 prior to activating any ONU 240, and may depend on a maximum fiber distance associated with optical distribution network 230. For example, the value of zero-distance equalization delay 570 may not be less than a sum of a round-trip optical signal propagation time and a processing time for an ONU 240 with a largest possible fiber distance.

In some implementations, in the TDM/TDMA PON system, a time may be slotted and may be organized in fixed-size physical frames. A physical frame may include a particular time period (e.g., in seconds, milliseconds, microseconds, nanoseconds, or the like). In a downstream direction, each OLT channel termination 210 may continuously transmit physical frames, and may insert, at the start of each physical frame, a physical synchronization block followed by a logical control header. In an upstream direction, the starts of upstream physical frames may form a sequence of reference points, and each reference point may be offset by a fixed amount with respect to the start of a corresponding downstream physical frame. From the perspective of OLT channel termination 210, an offset of each upstream frame with respect to the corresponding downstream frame may be equal to zero-distance equalization delay 570. In some implementations, a logical control header may include a bandwidth map. The bandwidth map may include instructions that instruct each ONU 240 to transmit an upstream burst and specify parameters of the burst (e.g., a size and an offset with respect to a common reference point, a start of the upstream physical frame, or the like).

As indicated above, FIG. 5 is provided merely as an example. Other examples are possible and may differ from what was described with regard to FIG. 5.

Figure 6:
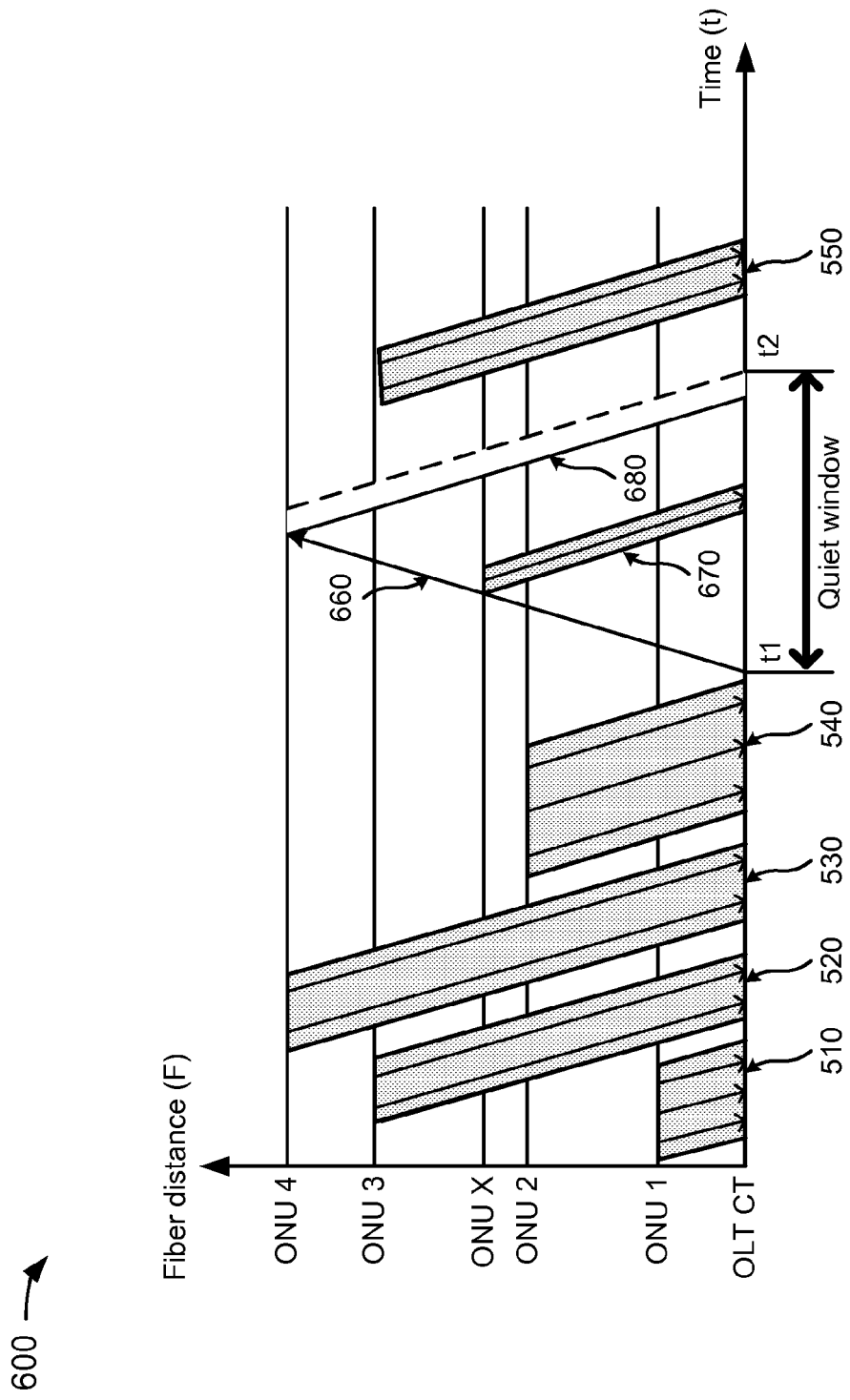
FIG. 6 is a diagram of an example round-trip delay measurement and the concept of a quiet window.

FIG. 6 is a diagram 600 of an example round-trip delay measurement and the concept of a quiet window. When a particular ONU 240 (e.g., ONU X) is activated on a TDM/TDMA PON system, OLT channel termination 210 may not initially know a round-trip time of ONU X. OLT channel termination 210 may invite ONUs 240 to declare their presence on the TDM/TDMA PON system by issuing a discovery grant 660 (e.g., known in ITU-T G.984 and G.987 systems as a serial number grant) at a first time (t1), as shown in FIG. 6. ONU X may respond to discovery grant 660 with a message 670 (e.g., a serial number message in the terminology of ITU-T G.984 and G.987).

To avoid interference between potential responses to discovery grant 660 and regular downstream transmission bursts by active ONUs 240, OLT channel termination 210 may suppress the downstream transmission bursts by active ONUs 240 (e.g., ONU 1, ONU 2, ONU 3, and ONU 4) during a time interval. The time interval may include the time between when a potentially earliest response by an ONU 240 with a shortest fiber distance (e.g., if a fiber distance has no lower limit, this is first time (t1) when discovery grant 660 is transmitted) is received, and a second time (t2) when a potentially latest response 680 from a farthest ONU 240 is received. The time interval, when OLT channel termination 210 suppresses the regular downstream transmission by active ONUs 240 to allow the new ONUs 240 to transmit their discovery grant responses, may be referred to as a quiet window, as further shown in FIG. 6. In the TDM/TDMA PON system, the size of the quiet window may depend on an uncertainty of the fiber distance of the activating ONU 240. For example, if optical distribution network 230 includes a fiber distance limit of 20 km, a fiber distance of the activating ONU 240 may range from 0 km to 20 km. The quiet window may accommodate a variation of an optical signal round-trip propagation time between 0 and approximately 200 microseconds (µs).

As indicated above, FIG. 6 is provided merely as an example. Other examples are possible and may differ from what was described with regard to FIG. 6.

Figure 7:
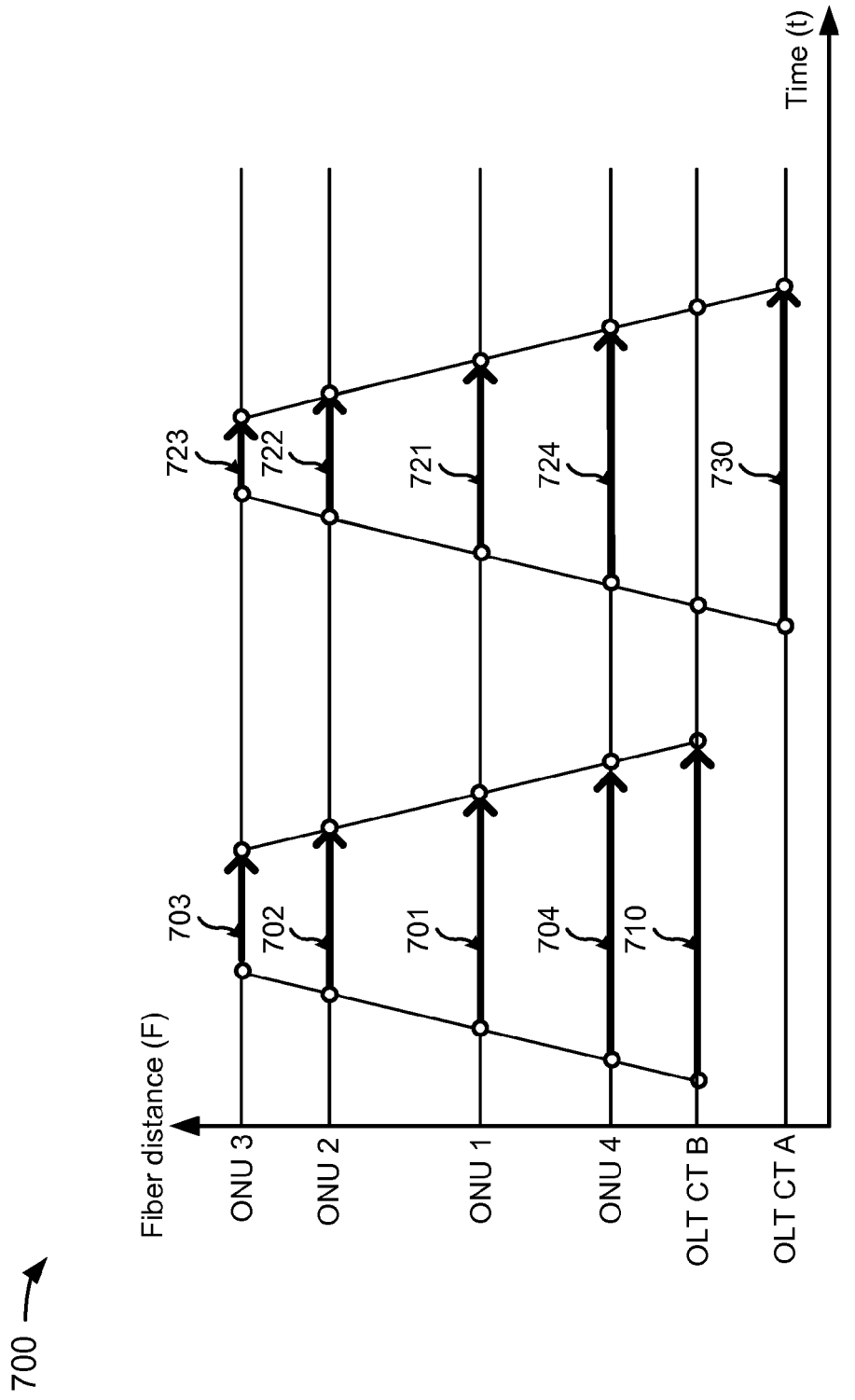
FIG. 7 is a diagram of an example equalization delay inconsistency in a multi-wavelength time and wavelength division multiplexing (TWDM) PON system.

FIG. 7 is a diagram 700 of an example equalization delay inconsistency in a multi-wavelength TWDM PON system. Assume that a new ONU 240 is activating on any of OLT channel terminations 210 of the multi-wavelength TWDM PON system. If a particular OLT channel termination 210 is unaware of lengths of the individual channel attachment fibers 270 in the system, the particular OLT channel termination 210 may select a value of the zero-distance equalization delay independently from other OLT channel terminations 210 in the system and based only on a maximum fiber distance associated with optical distribution network 230. In this case, an equalization delay assigned by the particular OLT channel termination 210 may be applicable for only the particular OLT channel termination 210.

As shown in FIG. 7, a particular OLT channel termination 210 (e.g., OLT CT B) may select a zero-distance equalization delay 710. If ONUs 240 (e.g., ONU 1, ONU 2, ONU 3, and ONU 4) are activated on OLT CT B, OLT CT B may assign equalization delays 701, 702, 703, and 704 to ONU 1, ONU 2, ONU 3, and ONU 4, respectively. Another OLT channel termination 210 (e.g., OLT CT A) may select a zero-distance equalization delay 730, which may be equal to zero-distance equalization delay 710, since both OLT CT A and OLT CT B may include identical information about the maximum fiber distance associated with optical distribution network 230. However, a length of a channel attachment fiber 270 associated with OLT CT A may not be equal to (e.g., is longer than) a length of a channel attachment fiber 270 associated with OLT CT B. Consequently, if ONU 1, ONU 2, ONU 3, and ONU 4 are activated on OLT CT A, OLT CT A may assign equalization delays 721, 722, 723, and 724 to ONU 1, ONU 2, ONU 3, and ONU 4, respectively. However, equalization delays 721-724 may be different than respective equalization delays 701-704, assigned by OLT CT B. Such an arrangement may lead to suboptimal performance when an ONU 240 is handed over from one OLT channel termination 210 (e.g., OLT CT A) to another OLT channel termination 210 (e.g., OLT CT B) (e.g., incompatibility of the equalization delays may require repeat ranging of ONU 240 on the target OLT channel termination 210). Such repeat ranging may take time and may cause a service interruption for a customer.

As indicated above, FIG. 7 is provided merely as an example. Other examples are possible and may differ from what was described with regard to FIG. 7.

FIGS. 8A-8E are diagrams of an example implementation relating to example process 400 shown in FIG. 4. FIGS. 8A-8E show an example of maintaining channel-invariant ONU equalization delay in a PON system, such as the TWDM PON system shown in FIG. 2. In the example implementation, assume that the TWDM PON system includes three OLT channel terminations 210 (e.g., OLT CT A, OLT CT B, and OLT CT C) and a pilot ONU.

Figure 8A:
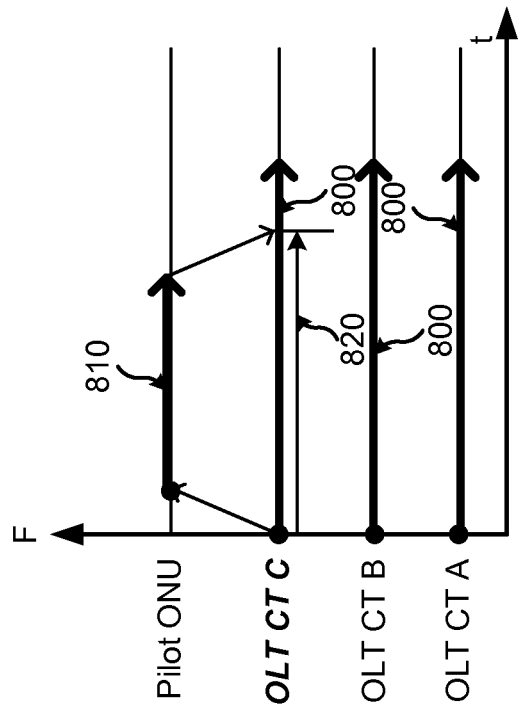

FIG. 8A may depict operations associated with blocks 410-430 of process 400. For example, OLT CT A, OLT CT B, and OLT CT C may agree on a global zero-distance equalization delay 800 and an order for OLT channel terminations 210 (e.g., OLT CT B→OLT CT C→OLT CT A). As further shown in FIG. 8, the pilot ONU may activate with OLT CT B, and OLT CT B may perform a round-trip delay measurement, may compute an equalization delay 810 based on the round-trip delay measurement, and may provide equalization delay 810 to the pilot ONU.

Figure 8B:
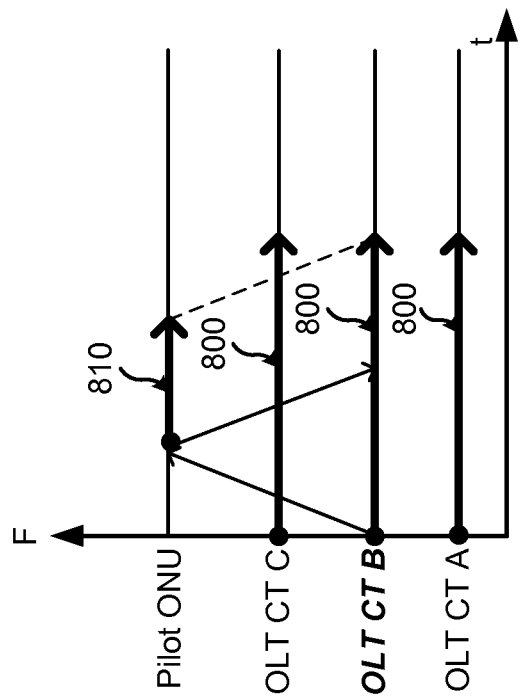

FIG. 8B may depict operations associated with blocks 440-460 and 480 of process 400. For example, OLT CT B may handover the pilot ONU to the next OLT channel termination 210 in the order (e.g., OLT CT C). OLT CT C may determine a round-trip delay 820 that includes an optical signal propagation time from OLT CT C to the pilot ONU and back, the pilot ONU processing time, and equalization delay 810. Since the determined round-trip delay 820 is less than OLT CT C's specific zero-distance equalization delay 800, OLT CT C may reduce the value of specific zero-distance equalization delay 800 to the value of round-trip delay 820.

FIG. 8C may depict operations associated with blocks 440-470 of process 400. For example, OLT CT C may handover the pilot ONU to the next OLT channel termination 210 in the order (e.g., OLT CT A). OLT CT A may determine a round-trip delay that includes an optical signal propagation time from OLT CT A to the pilot ONU and back, the pilot ONU processing time, and equalization delay 810. Since the determined round-trip delay is greater than OLT CT A's specific zero-distance equalization delay 800, OLT CT A may instruct the pilot ONU to reduce equalization delay 810 to a new equalization delay 815.

FIG. 8D may depict operations associated with blocks 440-460 and 480 of process 400. For example, OLT CT A may handover the pilot ONU to the next OLT channel termination 210 in the order (e.g., OLT CT B). OLT CT B may determine a round-trip delay 830 that includes an optical signal propagation time from OLT CT B to the pilot ONU and back, the pilot ONU processing time, and equalization delay 815. Since the determined round-trip delay 830 is less than OLT CT B's specific zero-distance equalization delay 800, OLT CT B may reduce the value of specific zero-distance equalization delay 800 to the value of round-trip delay 830.

Figure 8E:
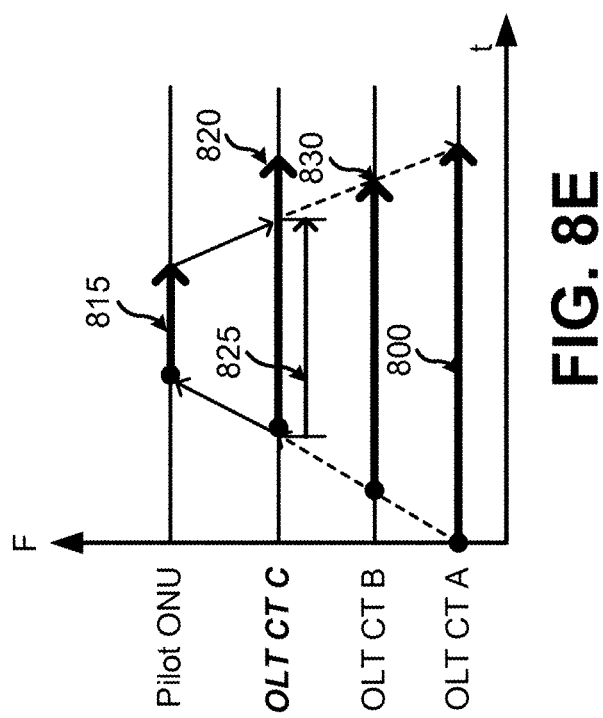

FIG. 8E may depict operations associated with blocks 440-460 and 480 of process 400. For example, OLT CT B may handover the pilot ONU to the next OLT channel termination 210 in the order (e.g., OLT CT C). OLT CT C may determine a round-trip delay 825 that includes an optical signal propagation time from OLT CT C to the pilot ONU and back, the pilot ONU processing time, and equalization delay 815. Since the determined round-trip delay 830 is less than OLT CT C's specific zero-distance equalization delay 820, OLT CT C may reduce the value of specific zero-distance equalization delay 820 to the value of round-trip delay 825.

The example implementation may terminate when the pilot ONU is handed over to OLT CT B (e.g., with which the pilot ONU is initially activated) for the second time. In some implementations, the set of OLT channel terminations 210 in the TWDM PON system may be traversed twice. During the first traversal, an OLT channel termination 210 with a largest length of channel attachment fiber 270 may set an equalization delay of the pilot ONU 240 to its smallest value. During the second traversal, the other OLT channel terminations 210 may adjust their specific zero-distance equalization delays to respective matching values.

As indicated above, FIGS. 8A-8E are provided merely as an example. Other examples are possible and may differ from what was described with regard to FIGS. 8A-8E.

Systems and/or methods, described herein, may maintain invariant ONU equalization delay across the multiple wavelength channels in a TWDM PON system and, therefore, may avoid the timing overhead and service interruptions associated with the need to perform a repeat ranging procedure when an ONU switches a wavelength channel.

The foregoing disclosure provides illustration and description, but is not intended to be exhaustive or to limit the implementations to the precise form disclosed. Modifications and variations are possible in light of the above disclosure or may be acquired from practice of the implementations.

As used herein, the term component is intended to be broadly construed as hardware, firmware, or a combination of hardware and software.

Some implementations are described herein in connection with thresholds. As used herein, satisfying a threshold may refer to a value being greater than the threshold, more than the threshold, higher than the threshold, greater than or equal to the threshold, less than the threshold, fewer than the threshold, lower than the threshold, less than or equal to the threshold, equal to the threshold, etc.

To the extent the aforementioned embodiments collect, store, or employ personal information provided by individuals, it should be understood that such information shall be used in accordance with all applicable laws concerning protection of personal information. Additionally, the collection, storage, and use of such information may be subject to consent of the individual to such activity, for example, through well known "opt-in" or "opt-out" processes as may be appropriate for the situation and type of information. Storage and use of personal information may be in an appropriately secure manner reflective of the type of information, for example, through various encryption and anonymization techniques for particularly sensitive information.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware can be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the terms "group" and "set" are intended to include one or more items (e.g., related items, unrelated items, a combination of related items and unrelated items, etc.), and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A method, comprising:
   determining, by a device, a zero-distance equalization delay for a plurality of channel terminations and an order for the plurality of channel terminations,
   the zero-distance equalization delay including a delay associated with a fiber distance and a signal propagation time equal to zero;
   determining, by the device, a round-trip propagation time between a first channel termination, based on the order for the plurality of channel terminations, and an optical network unit;
   determining, by the device, an equalization delay based on the round-trip propagation time;
   performing, by the device, a handover of the optical network unit to a next channel termination based on the order for the plurality of channel terminations;
   calculating, by the device, a round-trip delay for the next channel termination based on:
      a propagation time between the next channel termination and the optical network unit,
      a processing time associated with the optical network unit, and
      the equalization delay;
   comparing, by the device, the round-trip delay, for the next channel termination, with the zero-distance equalization delay to obtain a comparison result;
   altering, by the device, the zero-distance equalization delay based on the comparison result; and
   repeating, by the device, the performing, the calculating, the comparing, and the altering for remaining channel terminations of the plurality of channel terminations.

2. The method of claim 1, where, when the round-trip delay for the next channel termination is greater than the zero-distance equalization delay, the method further comprises:
   determining a difference between the round-trip delay for the next channel termination and the zero-distance equalization delay; and
   reducing the zero-distance equalization delay by the difference.

3. The method of claim 1, where, when the round-trip delay for the next channel termination is less than or equal to the zero-distance equalization delay, the method further comprises:
   setting the zero-distance equalization delay to be equivalent to the round-trip delay for the next channel termination.

4. The method of claim 1, where the device includes one or more of:
   a control computing device,
   one of the plurality of channel terminations, or
   the optical network unit.

5. The method of claim 1, where the plurality of channel terminations and the optical network unit form a time and wavelength division multiplexing (TWDM) passive optical network (PON).

6. The method of claim 1, where, when the first channel termination receives a handover of the optical network unit a second time, the method further comprises:
   performing a handover of the optical network unit to a target optical channel.

7. The method of claim 6, where, after performing the handover of the optical network unit to the target optical channel, the equalization delay is invariant across multiple wavelength channels associated with the plurality of channel terminations.

8. A device, comprising:
   one or more processors to:
      determine a zero-distance equalization delay and an order for a plurality of channel terminations associated with an optical network unit,
      the zero-distance equalization delay including a delay associated with a fiber distance and a signal propagation time equal to zero;
      determine a round-trip propagation time between a first channel termination, based on the order for the plurality of channel terminations, and the optical network unit;

determine an equalization delay based on the round-trip propagation time;
perform a handover of the optical network unit to a next channel termination based on the order for the plurality of channel terminations;
calculate a round-trip delay for the next channel termination based on:
  a propagation time between the next channel termination and the optical network unit,
  a processing time associated with the optical network unit, and
  the equalization delay;
compare the round-trip delay, for the next channel termination, with the zero-distance equalization delay to obtain a comparison result;
change the zero-distance equalization delay based on the comparison result; and
repeat, for remaining channel terminations of the plurality of channel terminations:
  the performance of the handover,
  the calculation of the round-trip delay,
  the comparison of the round-trip delay with the zero-distance equalization delay, and
  the changing of the zero-distance equalization delay.

9. The device of claim 8, where the one or more processors are further to:
provide the equalization delay to the optical network unit.

10. The device of claim 8, where, when the round-trip delay for the next channel termination is greater than the zero-distance equalization delay, the one or more processors are further to:
determine a difference between the round-trip delay for the next channel termination and the zero-distance equalization delay; and
reduce the zero-distance equalization delay by the difference.

11. The device of claim 8, where, when the round-trip delay for the next channel termination is less than or equal to the zero-distance equalization delay, the one or more processors are further to:
set the zero-distance equalization delay to be equivalent to the round-trip delay for the next channel termination.

12. The device of claim 8, where the device includes one or more of:
a control computing device,
one of the plurality of channel terminations, or
the optical network unit.

13. The device of claim 8, where the plurality of channel terminations and the optical network unit are associated with a time and wavelength division multiplexing (TWDM) passive optical network (PON).

14. The device of claim 8, where, when the first channel termination receives a handover of the optical network unit a second time, the one or more processors are further to:
perform a handover the optical network unit to a target optical channel,
where the equalization delay is invariant across multiple wavelength channels associated with the plurality of channel terminations.

15. A non-transitory computer-readable medium for storing instructions, the instructions comprising:
one or more instructions that, when executed by one or more processors of a device, cause the one or more processors to:
receive a zero-distance equalization delay and a logical ring order for a set of channel terminations associated with an optical network unit,
  the zero-distance equalization delay including a delay associated with a fiber distance and a signal propagation time equal to zero;
determine a round-trip propagation time between a first channel termination, based on the logical ring order for the set of channel terminations, and the optical network unit;
determine an equalization delay based on the round-trip propagation time;
perform a handover of the optical network unit to a next channel termination based on the logical ring order;
calculate a round-trip delay for the next channel termination based on:
  a propagation time between the next channel termination and the optical network unit,
  a processing time associated with the optical network unit, and
  the equalization delay;
compare the round-trip delay, for the next channel termination, with the zero-distance equalization delay to obtain a comparison result;
change the zero-distance equalization delay based on the comparison result; and
repeat the performance of the handover, the calculation of the round-trip delay, the comparison of the round-trip delay with the zero-distance equalization delay, and the changing of the zero-distance equalization delay for remaining channel terminations.

16. The non-transitory computer-readable medium of claim 15, where, when the round-trip delay for the next channel termination is greater than the zero-distance equalization delay, the one or more instructions, when executed by the one or more processors, further cause the one or more processors to:
determine a difference between the round-trip delay for the next channel termination and the zero-distance equalization delay; and
reduce the zero-distance equalization delay by the difference.

17. The non-transitory computer-readable medium of claim 15, where, when the round-trip delay for the next channel termination is less than or equal to the zero-distance equalization delay, the one or more instructions, when executed by the one or more processors, further cause the one or more processors to:
set the zero-distance equalization delay to be equivalent to the round-trip delay for the next channel termination.

18. The non-transitory computer-readable medium of claim 15, where the device includes one or more of:
a control computing device,
one or more of the set of channel terminations, or
the optical network unit.

19. The non-transitory computer-readable medium of claim 15, where the set of channel terminations and the optical network unit are associated with a time and wavelength division multiplexing (TWDM) passive optical network (PON).

20. The non-transitory computer-readable medium of claim 15, where, when the first channel termination receives a handover of the optical network unit a second time, the one or more instructions, when executed by the one or more processors, further cause the one or more processors to:
perform a handover the optical network unit to a target optical channel.

* * * * *